(12) United States Patent
Huang et al.

(10) Patent No.: US 12,488,026 B2
(45) Date of Patent: *Dec. 2, 2025

(54) METHOD AND APPARATUS FOR DIVIDING REGION, STORAGE MEDIUM, AND ELECTRONIC DEVICE

(71) Applicant: Tencent Technology (Shenzhen) Company Limited, Shenzhen (CN)

(72) Inventors: Fei Huang, Shenzhen (CN); Fan Yang, Shenzhen (CN); Yanchun Lin, Shenzhen (CN); Jia Liu, Shenzhen (CN); Rui Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,589

(22) Filed: Mar. 20, 2024

(65) Prior Publication Data
US 2024/0265038 A1    Aug. 8, 2024

Related U.S. Application Data

(63) Continuation of application No. 17/320,013, filed on May 13, 2021, now Pat. No. 11,966,424, which is a (Continued)

(30) Foreign Application Priority Data

Mar. 19, 2019  (CN) .......... 201910209714.6

(51) Int. Cl.
G06F 16/29    (2019.01)
G06F 16/22    (2019.01)
G06F 16/25    (2019.01)

(52) U.S. Cl.
CPC .......... *G06F 16/29* (2019.01); *G06F 16/2255* (2019.01); *G06F 16/258* (2019.01)

(58) Field of Classification Search
CPC ........ G06F 16/29; G06F 9/54; G06F 16/2255; G06F 16/258
(Continued)

(56) References Cited

U.S. PATENT DOCUMENTS 6,609,062 B2    8/2003  Hancock
9,141,641 B2    9/2015  Gaertner et al.
(Continued)

FOREIGN PATENT DOCUMENTS

CN    104602183 A  *  5/2015 .............. H04W 4/02
CN    106528597 A     3/2017
(Continued)

OTHER PUBLICATIONS

Tencent Technology, ISR, PCT/CN2020/078351, Jun. 5, 2020, 2 pgs.
(Continued)

Primary Examiner — Phuong Thao Cao
(74) Attorney, Agent, or Firm — Morgan, Lewis & Bockius LLP

(57) ABSTRACT

This application discloses a method and for dividing geographical regions performed by a computing device. The method includes: obtaining N groups of the place names, their corresponding latitudes and longitudes; converting the N groups of the place names, their corresponding latitudes and the longitudes into a first dataset; encoding latitudes and longitudes in the first dataset into a second dataset, each pair of latitude and longitude corresponding to a respective geographical region associated with a region number in the second dataset; converting the second dataset into a third dataset, the third dataset including M groups of the region
(Continued)

numbers, each group of region numbers representing central point latitudes and central point longitudes in the geographical regions represented by the group of region numbers; and dividing the geographical regions represented by the M groups of region numbers into P regions according to the third dataset.

17 Claims, 8 Drawing Sheets

Related U.S. Application Data continuation of application No. PCT/CN2020/078351, filed on Mar. 9, 2020.

(58) Field of Classification Search
USPC .......................................................... 707/756
See application file for complete search history.

(56) References Cited

U.S. PATENT DOCUMENTS

| | | | |
|---|---|---|---|
| 9,654,919 B2 * | 5/2017 | Hartzell | G06Q 50/01 |
| 10,146,794 B2 | 12/2018 | Mor et al. | |
| 10,467,580 B1 * | 11/2019 | Davidson | G06Q 10/08355 |
| 11,138,243 B2 * | 10/2021 | Oliver | G06F 16/29 |
| 11,151,210 B2 | 10/2021 | Li et al. | |
| 11,194,873 B1 | 12/2021 | McAnally | |
| 11,380,441 B1 * | 7/2022 | Baker | G06F 16/29 |
| 2003/0036842 A1 | 2/2003 | Hancock | |
| 2012/0197696 A1 | 8/2012 | Beyeler et al. | |
| 2013/0097163 A1 * | 4/2013 | Oikarinen | G06F 16/29 707/736 |
| 2013/0297206 A1 * | 11/2013 | Heng | G01C 21/3804 715/705 |
| 2014/0207795 A1 * | 7/2014 | Zhou | G06F 16/245 707/769 |
| 2015/0254276 A1 | 9/2015 | Oliver et al. | |
| 2016/0132513 A1 * | 5/2016 | Lim | G06F 16/285 707/740 |
| 2016/0140510 A1 * | 5/2016 | Schultz | G06Q 50/16 705/7.19 |
| 2016/0321351 A1 | 11/2016 | Mor et al. | |
| 2016/0358471 A1 | 12/2016 | Hajj et al. | |
| 2017/0184410 A1 * | 6/2017 | Zhang | H04W 4/029 |
| 2018/0025408 A1 | 1/2018 | Xu et al. | |
| 2018/0232397 A1 | 8/2018 | Liu et al. | |
| 2018/0232840 A1 * | 8/2018 | Liu | G06F 16/29 |
| 2020/0196309 A1 * | 6/2020 | Amouris | H04W 72/0446 |
| 2020/0336400 A1 | 10/2020 | Juen et al. | |
| 2021/0168152 A1 * | 6/2021 | Herrema, III | G06F 16/29 |

FOREIGN PATENT DOCUMENTS

| | | | |
|---|---|---|---|
| CN | 107193918 A | | 9/2017 |
| CN | 108073581 A * | 5/2018 | G06F 16/29 |
| CN | 108269087 A | | 7/2018 |
| CN | 108363733 A | | 8/2018 |
| CN | 108540988 A | | 9/2018 |
| CN | 109102334 A | | 12/2018 |
| CN | 110335068 A | | 10/2019 |
| JP | 2003288459 A * | 10/2003 | |
| JP | 2010079808 A | | 4/2010 |
| JP | 2012113625 A | | 6/2012 |
| JP | 2012168069 A | | 9/2012 |
| JP | 2013003597 A | | 1/2013 |
| JP | 2013542478 A | | 11/2013 |
| JP | 2015096867 A | | 5/2015 |
| JP | 2015225491 A | | 12/2015 |
| JP | 2016503937 A | | 2/2016 |
| JP | 2016520896 A | | 7/2016 |
| WO | WO-2017020765 A1 * | 2/2017 | G06F 16/00 |
| WO | WO 2018210057 A1 | | 11/2018 |
| WO | WO 2020168767 A1 | | 8/2020 |

OTHER PUBLICATIONS

Tencent Technology, WO, PCT/CN2020/078351, Jun. 5, 2020, 4 pgs.
Tencent Technology, IPRP, PCT/CN2020/078351, Sep. 16, 2021, 5 pgs.
Dr. Pavel Petrov et al., "Geohash-EAS—A Modified Geohash Geocoding System with Equal-Area Spaces", 18th International Multidisciplinary Scientific Geo Conference, Surveying Geology & Mining Ecology Management (SGEM), vol. 18, Issue 2.2, 2018, 8 pgs.

* cited by examiner

| geohash length | width | height |
|---|---|---|
| 1 | 5,009.4km | 4,992.6km |
| 2 | 1,252.3km | 624.1km |
| 3 | 156.5km | 156km |
| 4 | 39.1km | 19.5km |
| 5 | 4.9km | 4.9km |
| 6 | 1.2km | 609.4m |
| 7 | 152.9m | 152.4m |
| 8 | 38.2m | 19m |
| 9 | 4.8m | 4.8m |
| 10 | 1.2m | 59.5cm |
| 11 | 14.9cm | 14.9cm |
| 12 | 3.7cm | 1.9cm |

FIG. 4

METHOD AND APPARATUS FOR DIVIDING REGION, STORAGE MEDIUM, AND ELECTRONIC DEVICE

CROSS REFERENCE TO RELATED APPLICATIONS

This application is a continuation application of U.S. patent application Ser. No. 17/320,013, entitled "REGION DIVISION METHOD AND DEVICE, STORAGE MEDIUM AND ELECTRONIC DEVICE" filed on May 13, 2021, now U.S. Pat. No. 11,966,424, which is a continuation application of PCT Patent Application No. PCT/CN2020/078351, entitled "REGION DIVISION METHOD AND DEVICE, STORAGE MEDIUM AND ELECTRONIC DEVICE" filed on Mar. 9, 2020, which claims priority to Chinese Patent Application No. 201910209714.6, filed with the State Intellectual Property Office of the People's Republic of China on Mar. 19, 2019, and entitled "METHOD AND APPARATUS FOR DIVIDING REGION, STORAGE MEDIUM, AND ELECTRONIC DEVICE", all of which are incorporated herein by reference in their entirety.

FIELD OF THE TECHNOLOGY

This application relates to the field of computers, and in particular, to a technology for dividing a region.

BACKGROUND OF THE DISCLOSURE

At present, most of existing methods for dividing a region are based on store information, the density of stores, or transaction information of stores that are obtained through manual investigation, to divide a region where the stores are located. The specific process may be as follows: Investigators first go to each place to investigate and collect local information related to region division such as store information, the density of stores, or transaction information of stores, and then divide the region where the stores are located based on such information.

SUMMARY

Embodiments of this application provide a method and an apparatus for dividing a region, a storage medium, and an electronic device, which can implement region division efficiently and accurately.

According to an aspect of the embodiments of this application, a method for dividing geographical regions is provided, including: encoding latitudes and longitudes in a first dataset to obtain a second dataset, the first dataset recording N groups of latitudes and longitudes, each pair of latitude and longitude corresponding to a respective geographical region, N being a positive integer, and $N \geq 1$, and the second dataset recording N region numbers, and each of the region numbers being used for representing a corresponding geographical region; obtaining a third dataset from the second dataset, the third dataset including M groups of the region numbers, each group of region numbers representing central point latitudes and central point longitudes in the geographical regions represented by the group of region numbers, M being a positive integer, $M \geq 1$, and M being the quantity of the group of region numbers; and dividing the geographical regions represented by the M groups of region numbers into P regions according to the third dataset, P being a positive integer, $P \geq 1$, and each of the regions comprising at least one of the geographical regions represented by the corresponding group of region numbers.

According to an aspect of the embodiments of this application, an apparatus for dividing geographical regions is further provided, including: an encoding module, configured to encode latitudes and longitudes in a first dataset to obtain a second dataset, the first dataset recording N groups of latitudes and longitudes, each pair of latitude and longitude corresponding to a respective geographical region, N being a positive integer, and $N \geq 1$, and the second dataset recording N region numbers, and each of the region numbers being used for representing a corresponding geographical region; a first obtaining module, configured to obtain a third dataset from the second dataset, the third dataset including M groups of the region numbers, each group of region numbers representing central point latitudes and central point longitudes in the geographical regions represented by the group of region numbers, M being a positive integer, $M \geq 1$, and M being the quantity of the group of region numbers; and a division module, configured to divide the geographical regions represented by the M groups of region numbers into P regions according to the third dataset, P being a positive integer, $P \geq 1$, and each of the regions comprising at least one of the geographical regions represented by the corresponding group of region numbers.

In some embodiments, the apparatus further includes:
- a second obtaining module, configured to obtain N place names to be processed;
- a third obtaining module, configured to obtain a latitude and a longitude of a place represented by each place name in the N place names by calling an application programming interface (API) of a map application to obtain N groups of the place names, the latitudes, and the longitudes that have correspondences; and
- a forming module, configured to form the N groups of the place names, the latitudes, and the longitudes that have correspondences as the first dataset.

In some embodiments, the division module includes: a first determining unit, configured to determine, when there is a first region in the P regions, a second region neighboring to the first region in the P regions, the quantity of the geographical regions included in the first region being less than a fourth predetermined threshold; and an update unit, configured to update the geographical regions included in the first region to be located in the second region.

In some embodiments, the encoding module includes: an encoding unit, configured to encode the latitudes and the longitudes in the first dataset with GEOHASH to obtain the second dataset, the second dataset recording N groups of place names and GEOHASH codes that have correspondences, and the region numbers being the GEOHASH codes.

In some embodiments, the first obtaining module includes: a clustering unit, configured to cluster the GEOHASH codes recorded by the second dataset to obtain M different GEOHASH codes; a second determining unit, configured to determine, for the M different GEOHASH codes, a central point latitude in a geographical region represented by each GEOHASH code and a central point longitude in a geographical region represented by each GEOHASH code; and a recording unit, configured to record M groups of the GEOHASH codes, the central point latitudes in the geographical regions represented by the GEOHASH codes, and the central point longitudes in the geographical regions represented by the GEOHASH codes that have correspondences to obtain the third dataset.

In some embodiments, the apparatus further includes: a fourth obtaining module, configured to obtain place names included in a target region located in the P regions to obtain a place name set; a word segmentation module, configured to perform word segmentation on each place name in the place name set to obtain a word segmentation result; and a determining module, configured to determine, when there is a place name word that has the quantity of occurrences greater than a third predetermined threshold in the word segmentation result, the place name word as a region name of the target region.

In some embodiments, the third dataset records M groups of the region numbers, central point latitudes in the geographical regions represented by the region numbers, central point longitudes in the geographical regions represented by the region numbers, and quantities of places in the geographical regions represented by the region numbers that have correspondences; and the division module includes: a division unit, configured to divide, according to the quantity of places in the geographical region represented by each of the region numbers and distances between central points of the geographical regions represented by the M region numbers, the geographical regions represented by the M region numbers into P regions.

In some embodiments, the division unit includes: a determining subunit, configured to determine a weight value corresponding to a first central point in the geographical region represented by each of the region numbers according to the quantity of places in the geographical region represented by each of the region numbers; a marking subunit, configured to mark, according to the weight value corresponding to each first central point and the quantity of second central points other than the first central point existing in a range with the first central point as a center and a predetermined radius value as a radius, the first central point as a core object, a non-core object, or a noise object; and a processing subunit, configured to record, when the first central point is marked as the core object, and the geographical regions where the first central point and one central point existing in the second central points located in the range are located are recorded to be located in a target region, the geographical regions where the first central point and the second central points located in the range are located to be located in the target region; and record, when the first central point is marked as the core object, and the geographical regions where the first central point and all central points in the second central points located in the range are located are not recorded to be located in the region, the geographical regions where the first central point and the second central points located in the range are located to be located in the same region.

In some embodiments, the determining subunit is configured to determine a mean value of the quantities of places in the geographical regions represented by all the region numbers and a standard deviation of the quantities of places in the geographical regions represented by all the region numbers; determine a difference between the quantity of places in the geographical region represented by each of the region numbers and the mean value; and determine a ratio between the difference and the standard deviation as the weight value corresponding to the first central point in the geographical region represented by each of the region numbers.

In some embodiments, the marking subunit is configured to mark the first central point as the core object when the weight value is greater than a first predetermined threshold; mark, according to the quantity of the second central points other than the first central point existing in the range with the first central point as the center and the predetermined radius value as the radius, when the weight value is less than the first predetermined threshold and greater than a second predetermined threshold, the first central point as the core object, the non-core object, or the noise object; and mark, according to the quantity of the second central points other than the first central point existing in the range with the first central point as the center and the predetermined radius value as the radius, when the weight value is less than the second predetermined threshold, the first central point as the non-core object or the noise object.

In some embodiments, the apparatus further includes: a display module, configured to mark the P regions and/or the geographical regions represented by the M region numbers on an electronic map displayed on a client.

According to an aspect of the embodiments of this application, a storage medium is further provided, the storage medium storing a computer program, and the computer program being configured to perform, when run, the foregoing method.

According to an aspect of the embodiments of this application, an electronic device is further provided, including a memory and a processor, the memory storing a computer program, and the processor being configured to perform the foregoing method through the computer program.

According to an aspect of the embodiments of this application, a computer program product including instructions is further provided, the computer program product, when run on a computer, causing the computer to perform the foregoing method.

In the embodiments of this application, latitudes and longitudes in a first dataset are encoded to obtain a second dataset, the first dataset recording N groups of latitudes and longitudes that have correspondences, N being a positive integer, and N≥1, and the second dataset recording N region numbers, and each of the region numbers being used for representing a geographical region; a third dataset is obtained according to the second dataset, the third dataset recording M groups of the region numbers, central point latitudes in the geographical regions represented by the region numbers, and central point longitudes in the geographical regions represented by the region numbers that have correspondences, M being a positive integer, M≥1, and M being the quantity of the region numbers; and the geographical regions represented by the M region numbers are divided into P regions according to the third dataset, P being a positive integer, P≥1, and each of the regions including at least one of the geographical regions represented by the region numbers. Places are marked by longitudes and latitudes of the places, and the places are clustered according to the regions where the places are located based on location relationships between the longitudes and latitudes and the region numbers, to divide the clustered regions into P different regions, thereby implementing automatic region division and saving manpower. The standard of region division is unified, which can perform timely updating, there is a relatively small computation amount, and it is easy to draw a region range on a map. If a new place is added, the place can be directly added to a region where the place is located, thereby achieving the technical effect of improving the efficiency of region division, and further resolving the technical problem of the low efficiency of region division in the related art.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings:

FIG. 4 is a schematic diagram of precision of encoding with GEOHASH provided according to an embodiment of this application.

DESCRIPTION OF EMBODIMENTS

Figure 1:
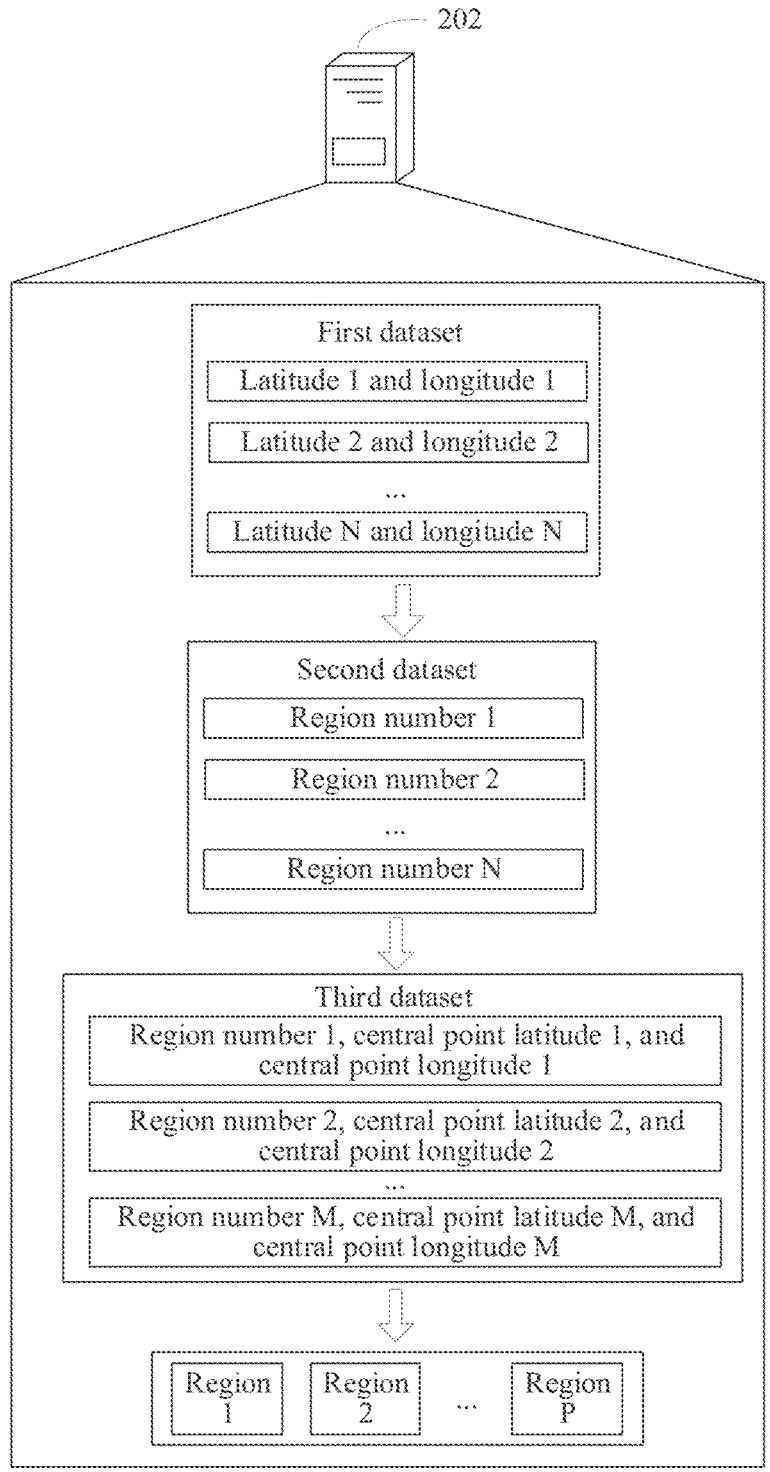
FIG. 1 is a schematic diagram of an application environment of an exemplary method for dividing a region according to an embodiment of this application.

To make a person skilled in the art better understand solutions of this application, the technical solutions in embodiments of this application are clearly and completely described below with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

The terms such as "first" and "second" in the specification, the claims, and the foregoing accompanying drawings of this application are intended to distinguish between similar objects, but are not necessarily used for describing a particular sequence or a chronological order. It is to be understood that the data termed in such a way are interchangeable in proper circumstances, so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

It is found through research that: conventional methods for dividing a region are based on store information, the density of stores, or transaction information of stores that are obtained through manual investigation, to divide a region where the stores are located. In addition, the conventional methods for dividing a region have the technical problems of waste of manpower in data collection, inconsistent criteria of region division, and not supporting real-time update, and therefore is difficult for implementation and requires a large calculation amount, making it difficult to draw the range of the trading area on a map. Once a new merchant joins, there is a need for redivision, causing a low efficiency of region division.

For the foregoing technical problems existing in the conventional methods for dividing a region, the embodiments of this application provide a method for dividing a region, which can improve the efficiency of region division.

Specifically, in the method for dividing a region provided in the embodiments of this application, first, latitudes and longitudes in a first dataset are encoded to obtain a second dataset; then, a third dataset is obtained according to the second dataset, so that the third dataset records M groups of the region numbers, central point latitudes in the geographical regions represented by the region numbers, and central point longitudes in the geographical regions represented by the region numbers that have correspondences, M being a natural number and the quantity of the region numbers; and finally, the geographical regions represented by the M region numbers are divided into P regions according to the third dataset. The first dataset records N groups of latitudes and longitudes that have correspondences, N being a positive integer, and N≥1, the second dataset records N region numbers, and each of the region numbers is used for representing a geographical region, P is a positive integer, P≥1, and each of the regions includes at least one of the geographical regions represented by the region numbers. In this case, region division is implemented efficiently and accurately.

It is to be understood that the method for dividing a region provided in the embodiments of this application is applicable to a data processing device, such as a terminal device or a server. The terminal device may be specifically a smartphone, a computer, a personal digital assistant (PDA), a tablet computer, or the like, and the server may be specifically an application server, or may be a web server. During actual deployment, the server may be an independent server, or may be a cluster server.

For case of understanding of the technical solutions provided in the embodiments of this application, an example in which the method for dividing a region provided in the embodiments of this application is applied to a server is used below for exemplarily describing an application scenario to which the method for dividing a region provided in the embodiments of this application is applicable.

The method for dividing a region provided in this embodiment may be applied to a hardware environment formed by a server 202 shown in FIG. 1. As shown in FIG. 1, the server 202 first encodes latitudes and longitudes in a first dataset to obtain a second dataset, the first dataset recording N groups of latitudes and longitudes that have correspondences, N being a positive integer, and N≥1, and the second dataset recording N region numbers, and each of the region numbers being used for representing a geographical region. The server 202 then obtains a third dataset according to the second dataset, the third dataset recording M groups of the region numbers, central point latitudes in the geographical regions represented by the region numbers, and central point longitudes in the geographical regions represented by the region numbers that have correspondences, M being a positive integer, M≥1, and M being the quantity of the region numbers. Finally, the server 202 divides the geographical regions represented by the M region numbers into P regions according to the third dataset, P being a positive integer, P≥1, and each of the regions including at least one of the geographical regions represented by the region numbers.

In this embodiment, the foregoing method for dividing a region may be applied to, but is not limited to, a scenario of dividing a region to be divided into a plurality of subregions. The foregoing computer device may be, but is not limited to, a server of various types of applications, such as an on-line education application, an instant messaging application, a community space application, a game application, a shopping application, a browser application, a financial application, a multimedia application, a live broadcast application, a navigation application, and a merchant-recommended application. This is merely an example, and this embodiment is not limited thereto.

In this embodiment, the foregoing region may include, but is not limited to, a commercial region, an urban block, a cultural region, a landscape region, a sales region, and the like. For example, the commercial region, referred to as a commercial district, that is, a merchant gathering region, is a region organically formed by commercial facilities such as stores, markets, restaurants, office buildings, and hotels and public facilities such as streets, stations, and pedestrian streets in the city, which is the main essence and downtown region in the city. The commercial district is one of the concepts of real estate development, and it has important applications in scenarios such as business operation, small and micro enterprise risk control, marketing, and merchant search. Due to differences in commodities, transportation factors, geographic locations, and operation scales, there are great differences in scales and forms of various commercial districts.

In business operation, characteristics of the commercial district have a key impact on merchant operation, including human traffic, transportation, infrastructure, nearby residential or work regions, user group differences, industry distribution, and the like. The merchant needs to learn information about each commercial district to select correct locations and adopt appropriate operation strategies. Therefore, the method for dividing a commercial district provided in this embodiment is an important basic technology in a merchant location selection system and a merchant operation analysis system. For example, the location selection system may display the range and merchant quantity of commercial districts across the country. If other data of the platform is combined, various indicators of the commercial districts may be constructed, such as the quantity of paying users, per customer transaction, merchant types, user group characteristics (gender, age, education, and the like), so as to help merchants perform location selection analysis and operation analysis.

In business analysis, the determination of a merchant also needs to learn commercial district information and changes to help correctly evaluate the operation risk of the merchant. The method for dividing a commercial district provided in this embodiment helps to quickly identify changes in the commercial district, and therefore helps to improve the risk control capability in loan business of small and micro enterprises. For example, last year, the range of identified commercial district was 1,000 square meters, involving 500 merchants; and this year, the range of identified commercial district was only 800 square meters, involving 400 merchants. It is possible that the human traffic and attractiveness of the commercial district get worse, and the operation capacity of the local merchants may also be at risk of decline.

In addition, commercial district information may help marketers better select locations for marketing and choose offline commercial districts and merchants for cooperation. It also plays an important role in the operation of Internet services.

For ease of understanding of the method for dividing a region provided in the embodiments of this application, descriptions are provided in the following with reference to the accompanying drawings.

Figure 2:
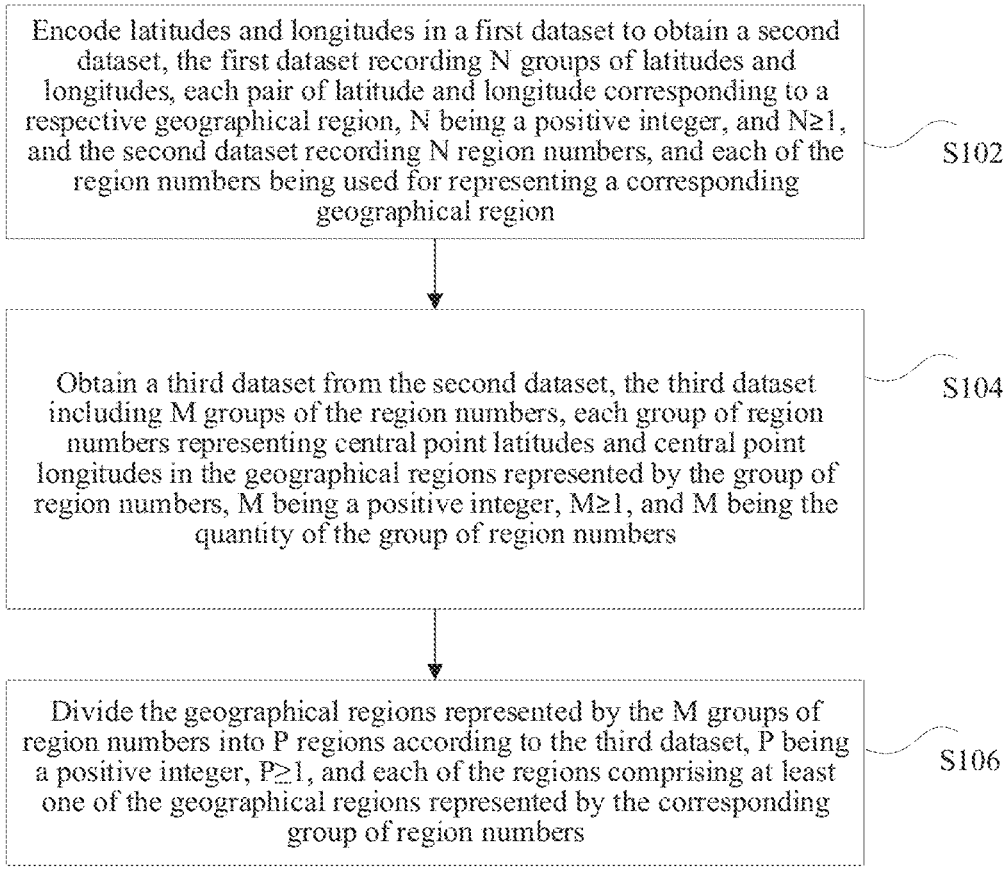
FIG. 2 is a schematic diagram of an exemplary method for dividing a region according to an embodiment of this application.

According to an aspect of the embodiments of this application, a method for dividing a region is provided. As shown in FIG. 2, the method includes the following steps:

S102. Encode latitudes and longitudes in a first dataset to obtain a second dataset, the first dataset recording N groups of latitudes and longitudes, each pair of latitude and longitude corresponding to a respective geographical region, N being a positive integer, and N≥1, and the second dataset recording N region numbers, and each of the region numbers being used for representing a corresponding geographical region.

S104. Obtain a third dataset from the second dataset, the third dataset including M groups of the region numbers, each group of region numbers representing central point latitudes and central point longitudes in the geographical regions represented by the group of region numbers, M being a positive integer, M≥1, and M being the quantity of the group of region numbers.

S106. Divide the geographical regions represented by the M groups of region numbers into P regions according to the third dataset, P being a positive integer, P≥1, and each of the regions comprising at least one of the geographical regions represented by the corresponding group of region numbers.

For ease of understanding of the method for dividing a region provided in the embodiments of this application, related contents and specific implementations of S102, S104, and S106 are provided in the following.

In this embodiment, the first dataset records N groups of latitudes and longitudes that have correspondences, N is a positive integer, and N≥1. For example: the first dataset={ (latitude 1, longitude 1), (latitude 2, longitude 2), . . . , (latitude N, longitude N); N being the total number of merchants}.

In this embodiment, the second dataset records N region numbers. For example: when the region number is a GEOHASH code, the second dataset records N GEOHASH codes, and specifically, the second dataset={(GEOHASH code 1), (GEOHASH code 2), . . . , (GEOHASH code N); N being the quantity of merchants}.

In this embodiment, the third dataset records M groups of the region numbers, central point latitudes in the geographical regions represented by the region numbers, and central point longitudes in the geographical regions represented by the region numbers that have correspondences. For example: the third dataset={(GEOHASH code 1, central point latitude 1, central point longitude 1), (GEOHASH code 2, central point latitude 2, central point longitude 2), . . . , (GEOHASH code M, central point latitude M, central point longitude M); M being the quantity of GEOHASH codes, that is, the number of groups of the foregoing correspondences}.

In some embodiments, in this embodiment, the geographical regions represented by the M region numbers may be clustered according to the region numbers to obtain the P regions. P may be less than or equal to M.

It may be learned according to the related contents of the foregoing steps that, in the embodiments of this application, places may be marked by longitudes and latitudes of the places, and the places are clustered according to the regions where the places are located based on location relationships between the longitudes and latitudes and the region numbers, to divide the clustered regions into P different regions, thereby implementing automatic region division and saving manpower. The standard of region division is unified, which can perform timely updating, there is a relatively small computation amount, and it is easy to draw a region range on a map. If a new place is added, the place can be directly added to a region where the place is located, thereby achieving the technical effect of improving the efficiency of region division, and further resolving the technical problem of the low efficiency of region division in the related art.

In an exemplary solution, before the encoding latitudes and longitudes in a first dataset, the method further includes the following steps:

S1. Obtain N place names to be processed.

S2. Obtain a latitude and a longitude of a place represented by each place name in the N place names by calling an API of a map application to obtain N groups of the place names, the latitudes, and the longitudes that have correspondences.

S3. Form the N groups of the place names, the latitudes, and the longitudes that have correspondences as the first dataset.

In some embodiments, in this embodiment, the first dataset may record N groups of merchant names, latitudes, and longitudes that have correspondences, N is a positive integer, and N≥1. For example: the first dataset={(merchant name 1, latitude 1, longitude 1), (merchant name 2, latitude 2, longitude 2), . . . , (merchant name N, latitude N, longitude N); N being the total number of merchants}.

In some embodiments, in this embodiment, the N place names may be obtained by data mining on existing service data or crawling data on the website, or the like. For example: place data is mined from payment service data of applications, or place data is crawled from place-recommended websites.

In some embodiments, this embodiment may, but is not limited to, locate the place by calling the API of the map application to obtain the latitude and longitude data of the place. The map application may be an application for navigation, or a navigation function embedded in other applications.

In an exemplary solution, the dividing the geographical regions represented by the M region numbers into P regions according to the third dataset includes the following steps:

S21. Determine, when there is a first region in the P regions, a second region neighboring to the first region in the P regions, the quantity of the geographical regions included in the first region being less than a fourth predetermined threshold.

S22. Update the geographical regions included in the first region to be located in the second region.

In this embodiment, a smaller region (for example: the quantity of the included geographical regions is less than the fourth predetermined threshold (such as 5, 10, or 20)) may be merged into a larger region around it, or may be merged with other smaller regions around it into the same region.

In an exemplary solution, the encoding latitudes and longitudes in a first dataset to obtain a second dataset is specifically: encoding the latitudes and the longitudes in the first dataset with GEOHASH to obtain the second dataset, the second dataset recording N groups of place names and GEOHASH codes that have correspondences, and the region numbers being the GEOHASH codes.

Figure 3:
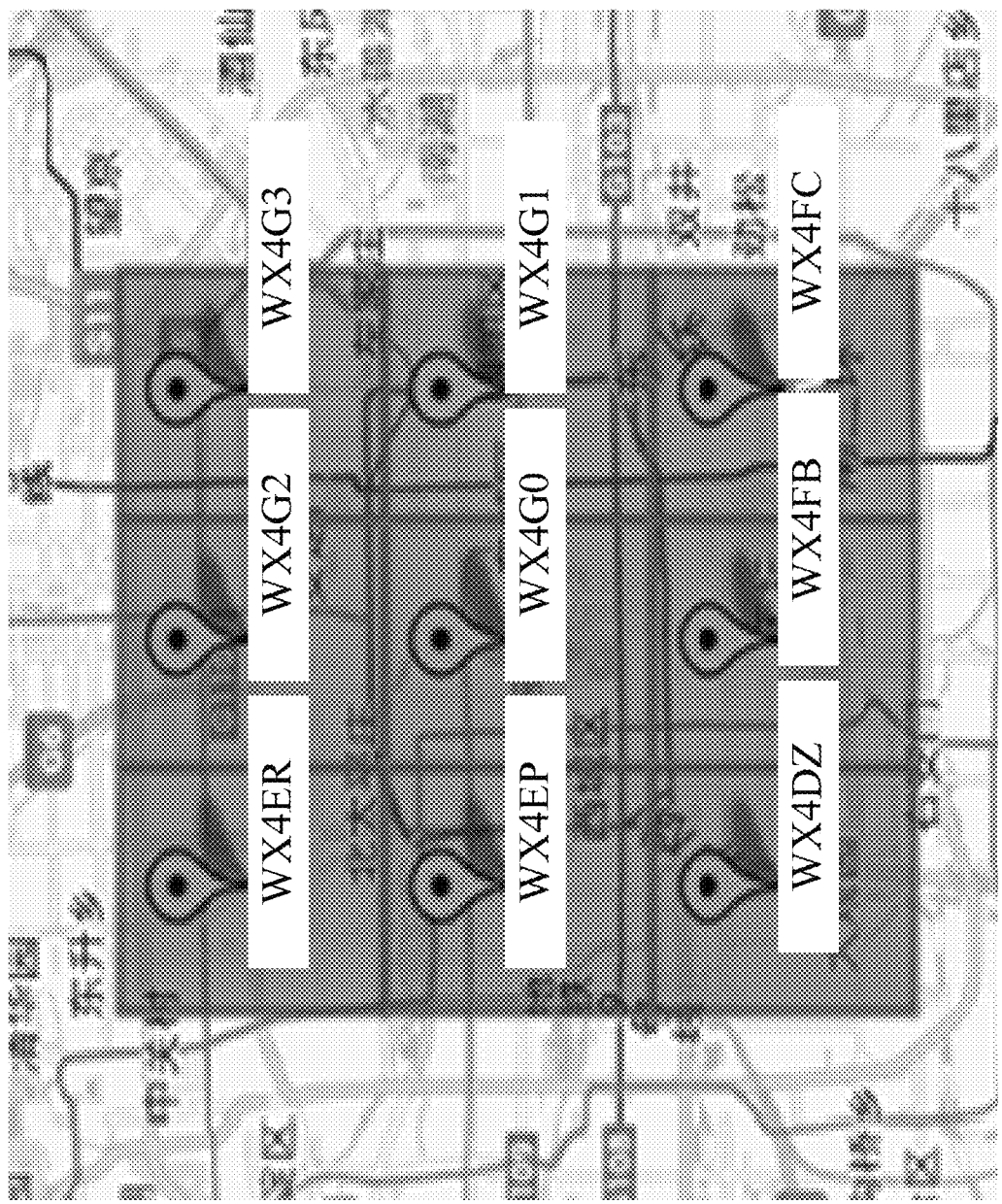
FIG. 3 is a schematic diagram of a GEOHASH character string provided according to an embodiment of this application.

In some embodiments, in this embodiment, an encoding manner may include, but is not limited to, encoding with GEOHASH. Encoding with GEOHASH is to convert two-dimensional latitudes and longitudes into character strings. FIG. 3 shows GEOHASH character strings of nine regions in Beijing, namely WX4ER, WX4G2, WX4G3, etc., and each character string represents a certain rectangular region.

The precision of the encoding with GEOHASH may be adjusted by the length of the character string, and the longer the character string, the more accurate the represented range. For example, a code with a five-digit number can represent a rectangular region with a range of 10 square kilometers, while a code with a six-digit number can represent a finer region (about 0.34 square kilometers). The precision of the encoding with GEOHASH is shown in FIG. 4.

In some embodiments, in this embodiment, the latitudes and the longitudes in the first dataset are encoded with GEOHASH to obtain the second dataset, the second dataset recording N groups of merchant names and GEOHASH codes that have correspondences, and the region numbers being the GEOHASH codes.

In some embodiments, in this embodiment, the precision of the GEOHASH code is set to be greater than predetermined precision.

In some embodiments, in this embodiment, the second dataset records N groups of merchant names and region numbers that have correspondences. For example: the second dataset records N groups of merchant names and GEOHASH codes that have correspondences, and the region numbers are the GEOHASH codes. The second dataset={ (merchant name 1, GEOHASH code 1), (merchant name 2, GEOHASH code 2), . . . , (merchant name N, GEOHASH code N); N being the quantity of merchants}.

In an exemplary solution, the obtaining the third dataset according to the second dataset includes the following steps:

S31. Cluster the GEOHASH codes recorded by the second dataset to obtain M different GEOHASH codes.

S32. Determine, for the M different GEOHASH codes, a central point latitude in a geographical region represented by each GEOHASH code and a central point longitude in a geographical region represented by each GEOHASH code.

S33. Record M groups of the GEOHASH codes, the central point latitudes in the geographical regions represented by the GEOHASH codes, and the central point longitudes in the geographical regions represented by the GEOHASH codes that have correspondences to obtain the third dataset.

In some embodiments, in this embodiment, the third dataset records M groups of the region numbers, central point latitudes in the geographical regions represented by the region numbers, central point longitudes in the geographical regions represented by the region numbers, and merchant quantities in the geographical regions represented by the region numbers that have correspondences. For example: the third dataset={(GEOHASH code 1, central point latitude 1, central point longitude 1, merchant quantity 1), (GEOHASH code 2, central point latitude 2, central point longitude 2, merchant quantity 2), . . . , (GEOHASH code M, central point latitude M, central point longitude M, merchant quantity M); M being the quantity of GEOHASH codes}.

In an exemplary solution, after the dividing the geographical regions represented by the M region numbers into P regions according to the third dataset, the method further includes the following steps:

S11. Obtain place names included in a target region located in the P regions to obtain a place name set.

S12. Perform word segmentation on each place name in the place name set to obtain a word segmentation result.

S13. Determine, when there is a place name word that has the quantity of occurrences greater than a third predetermined threshold in the word segmentation result, the place name word as a region name of the target region.

In some embodiments, in this embodiment, the place names included in the target region are obtained through the latitude and longitude of the central point of each region, the opening of the API of the map application, and reverse address resolution. When regions are named, a priority order of "well-known surrounding region→commercial district-→township street→first-level landmark→second-level landmark→intersection" is used to determine names of the regions. If there are a plurality of regions with the same name, a next priority is used. For example: well-known surrounding regions in the plurality of regions are the same, the commercial district information is used, and if the commercial district information is the same again, the township street is used, and so on. Finally, each region has a unique name.

In some embodiments, in this embodiment, distinguished names may only be kept as the names of the commercial districts.

In an exemplary solution, the third dataset records M groups of the region numbers, central point latitudes in the geographical regions represented by the region numbers, central point longitudes in the geographical regions represented by the region numbers, and quantities of places in the geographical regions represented by the region numbers that have correspondences.

In this case, the dividing the geographical regions represented by the M region numbers into P regions according to the third dataset is specifically: dividing, according to the quantity of places in the geographical region represented by each of the region numbers and distances between central points of the geographical regions represented by the M region numbers, the geographical regions represented by the M region numbers into P regions.

In some embodiments, this embodiment may, but is not limited to, divide the regions according to the distances between the geographical regions (for example, the distances between the geographical regions are represented by the distances between the central points), for example, the geographical regions that have a longer distance may belong to different regions, and the geographical regions that have a shorter distance belong to the same region.

In an exemplary solution, the dividing, according to the quantity of places in the geographical region represented by each of the region numbers and distances between central points of the geographical regions represented by the M region numbers, the geographical regions represented by the M region numbers into P regions includes the following steps:

S41. Determine a weight value corresponding to a first central point in the geographical region represented by each of the region numbers according to the quantity of places in the geographical region represented by each of the region numbers.

S42. Mark, according to the weight value corresponding to each first central point and the quantity of second central points other than the first central point existing in a range with the first central point as a center and a predetermined radius value as a radius, the first central point as a core object, a non-core object, or a noise object.

S23. Record, when the first central point is marked as the core object, and the geographical regions where the first central point and one central point existing in the second central points located in the range are located are recorded to be located in a target region, the geographical regions where the first central point and the second central points located in the range are located to be located in the target region; and record, when the first central point is marked as the core object, and the geographical regions where the first central point and all central points in the second central points located in the range are located are not recorded to be located in the region, the geographical regions where the first central point and the second central points located in the range are located to be located in the same region.

In some embodiments, in this embodiment, because the quantity of merchants in each geographical region is different, by adding the weight value W determined according to the quantity of merchants in the geographical regions, the density of points in the cluster can be better described, and clustering results are optimized.

In an exemplary solution, the determining a weight value corresponding to a first central point in the geographical region represented by each of the region numbers according to the quantity of places in the geographical region represented by each of the region numbers includes the following steps:

S51. Determine a mean value of the quantities of places in the geographical regions represented by all the region numbers and a standard deviation of the quantities of places in the geographical regions represented by all the region numbers.

S52. Determine a difference between the quantity of places in the geographical region represented by each of the region numbers and the mean value.

S53. Determine a ratio between the difference and the standard deviation as the weight value corresponding to the first central point in the geographical region represented by each of the region numbers.

For example: the weight value W uses the foregoing S51-S53 to implement standardized processing shown in this formula:

$$w_i = \frac{N_i - \mu}{\sigma}$$

where, $N_i$ is the quantity of places (for example, the merchant quantity) of an $i^{th}$ geographical region, $\mu$ is the mean value of the quantities of places (for example, the merchant quantities) of all geographical regions, and $\sigma$ is the standard deviation of the quantities of places (for example, the merchant quantities) of all geographical regions.

In an exemplary solution, the marking, according to the weight value corresponding to each first central point and the quantity of second central points other than the first central point existing in a range with the first central point as a center and a predetermined radius value as a radius, the first central point as a core object, a non-core object, or a noise object includes:

marking the first central point as the core object when the weight value is greater than a first predetermined threshold;

marking, according to the quantity of the second central points other than the first central point existing in the range with the first central point as the center and the predetermined radius value as the radius, when the weight value is less than the first predetermined threshold and greater than a second predetermined threshold, the first central point as the core object, the non-core object, or the noise object; and marking, according to the quantity of the second central points other than the first central point existing in the range with the first central point as the center and the predetermined radius value as the radius, when the weight value is less than the second predetermined threshold, the first central point as the non-core object or the noise object.

In some embodiments, in this embodiment, when whether the central point is the core object is determined, if the weight value is greater than a certain threshold (an empirical value is 5, representing the quantity of places (for example, the merchant quantity) being 5σ greater than the mean value), the central point is directly marked as the core object; and if the weight value is less than another threshold (an empirical value is 0, representing the quantity of places (for example, the merchant quantity) being lower than an average level), the central point is not determined as the core object.

In an exemplary implementation, dividing a commercial district is used as an example, the following steps are repeatedly performed on central points of the geographical regions represented by the M region numbers, until the central points of the geographical regions represented by all the region numbers are marked to obtain P commercial districts:

S61. Select an unmarked central point from M central points as a current central point.

S62. Mark, according to the quantity of central points other than the current central point existing in a range with the current central point as a center and a predetermined radius value as a radius, the current central point as a core object, a non-core object, or a noise object.

S63. Record, when the current central point is marked as the core object, and the geographical regions where the current central point and one central point existing in the central points located in the range are located are recorded to be located in a target commercial district, the geographical regions where the current central point and the central points located in the range are located to be located in the target commercial district; and record, when the current central point is marked as the core object, and the geographical regions where the current central point and all central points in the central points located in the range are located are not recorded to be located in the commercial district, the geographical regions where the current central point and the central points located in the range are located to be located in the same commercial district.

In some embodiments, this implementation may, but is not limited to, use the following manner to mark the core object, the non-core object, or the noise object:

S71. Determine the weight value corresponding to the current central point according to the quantity of places (for example, the merchant quantity) of the geographical region where the current central point is located.

S72. Mark the current central point as the core object when the weight value is greater than a first predetermined threshold.

S73. Mark, according to the quantity of the central points other than the current central point existing in the range with the current central point as the center and the predetermined radius value as the radius, when the weight value is less than the first predetermined threshold and greater than a second predetermined threshold, the current central point as the core object, the non-core object, or the noise object.

S74. Mark, according to the quantity of the central points other than the current central point existing in the range with the current central point as the center and the predetermined radius value as the radius, when the weight value is less than the second predetermined threshold, the current central point as the non-core object or the noise object.

In some embodiments, this implementation, when the weight value is less than the first predetermined threshold and greater than the second predetermined threshold, may, but is not limited to, use the following manner to mark the core object, the non-core object, or the noise object:

S81. Mark, when the quantity of the central points other than the current central point existing in the range with the current central point as the center and the predetermined radius value as the radius is greater than a fifth predetermined threshold, the current central point and the central points in the range, the current central point being marked as the core object.

S82. Mark, when the quantity of the central points other than the current central point existing in the range with the current central point as the center and the predetermined radius value as the radius is less than or equal to the fifth predetermined threshold and is greater than or equal to 1, the current central point as the non-core object.

S83. Mark, when there is no central point other than the current central point existing in the range with the current central point as the center and the predetermined radius value as the radius, the current central point as the noise object.

In some embodiments, this embodiment, when the weight value is less than the first predetermined threshold and greater than the second predetermined threshold, may, but is not limited to, use an algorithm of density-based spatial clustering of applications with noise (DBSCAN) to determine which one among the core object, the non-core object, or the noise object the central point is.

In some embodiments, this implementation, when the weight value is less than the second predetermined threshold, may, but is not limited to, use the following manner to mark the non-core object or the noise object:

S1. Mark, when there are other central points other than the current central point existing in the range with the current central point as the center and the predetermined radius value as the radius, the current central point as the non-core object.

S2. Mark, when there is no central point other than the current central point existing in the range with the current central point as the center and the predetermined radius value as the radius, the current central point as the noise object.

In some embodiments, this embodiment, when the weight value is less than the second predetermined threshold, may, but is not limited to, use the DBSCAN algorithm to determine the central point as the non-core object or the noise object.

In an exemplary solution, after the dividing the geographical regions represented by the M region numbers into P regions according to the third dataset, the method further includes the following steps:

S1. Mark the P regions and/or the geographical regions represented by the M region numbers on an electronic map displayed on a client.

In some embodiments, in this embodiment, information about divided regions may be transmitted to the client for displaying.

Figure 5:
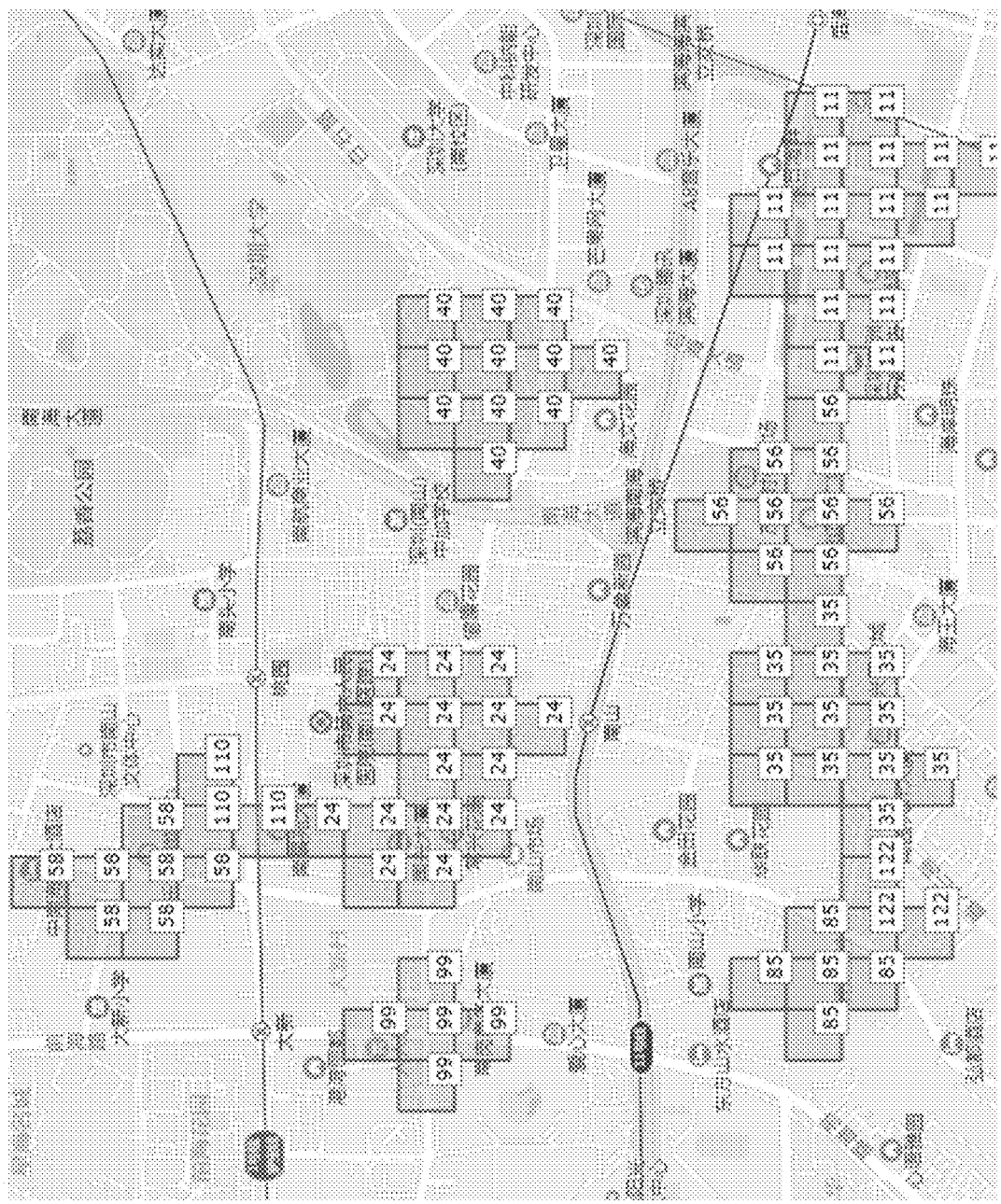
FIG. 5 is a schematic diagram of information about divided regions displayed on a client provided according to an embodiment of this application.

For example: as shown in FIG. 5, each grid represents a GEOHASH region, and a number code represents a region number to which it belongs.

For ease of description, the foregoing method embodiments are stated as a series of action combinations. However, a person skilled in the art is to learn that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required to this application.

According to the descriptions in the foregoing implementations, a person skilled in the art may clearly learn that the method according to the foregoing embodiments may be implemented by relying on software and a commodity hardware platform or by using hardware. However, in most cases, the former is a preferred implementation. Based on such an understanding, the technical solutions of this application essentially or the part contributing to the existing technologies may be implemented in the form of a software product. The computer software product is stored in a storage medium (for example, a read-only memory (ROM)/random access memory (RAM), a magnetic disk, or an optical disc), and includes several instructions for instructing a terminal device (which may be a mobile phone, a computer, a server, a network device, or the like) to perform the method described in the embodiments of this application.

Figure 6:
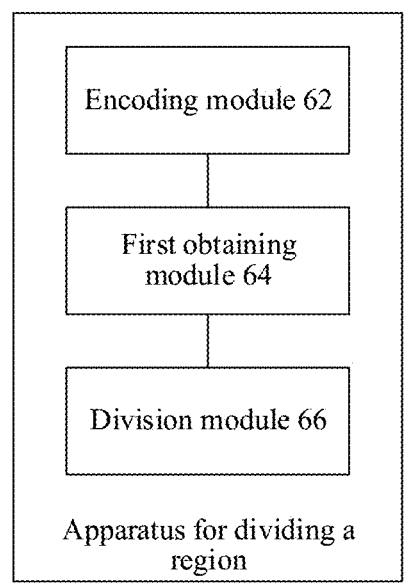
FIG. 6 is a schematic diagram of an exemplary apparatus for dividing a region according to an embodiment of this application.

According to an aspect of the embodiments of this application, an apparatus for dividing a region configured to implement the foregoing method for dividing a region is further provided. As shown in FIG. 6, the apparatus includes:

1) an encoding module 62, configured to encode latitudes and longitudes in a first dataset to obtain a second dataset, the first dataset recording N groups of latitudes and longitudes that have correspondences, N being a positive integer, and N≥1, and the second dataset recording N region numbers, and each of the region numbers being used for representing a geographical region;
2) a first obtaining module 64, configured to obtain a third dataset according to the second dataset, the third dataset recording M groups of the region numbers, central point latitudes in the geographical regions represented by the region numbers, and central point longitudes in the geographical regions represented by the region numbers that have correspondences, M being a positive integer, M≥1, and M being the quantity of the region numbers; and
3) a division module 66, configured to divide the geographical regions represented by the M region numbers into P regions according to the third dataset, P being a positive integer, P≥1, and each of the regions including at least one of the geographical regions represented by the region numbers.

In some embodiments, the apparatus further includes:
a second obtaining module, configured to obtain N place names to be processed;
a third obtaining module, configured to obtain a latitude and a longitude of a place represented by each place name in the N place names by calling an API of a map application to obtain N groups of the place names, the latitudes, and the longitudes that have correspondences; and
a forming module, configured to form the N groups of the place names, the latitudes, and the longitudes that have correspondences as the first dataset.

In some embodiments, the division module 66 includes: a first determining unit, configured to determine, when there is a first region in the P regions, a second region neighboring to the first region in the P regions, the quantity of the geographical regions included in the first region being less than a fourth predetermined threshold; and an update unit, configured to update the geographical regions included in the first region to be located in the second region.

In some embodiments, the encoding module 62 includes: an encoding unit, configured to encode the latitudes and the longitudes in the first dataset with GEOHASH to obtain the second dataset, the second dataset recording N groups of place names and GEOHASH codes that have correspondences, and the region numbers being the GEOHASH codes.

In some embodiments, the first obtaining module 64 includes: a clustering unit, configured to cluster the GEOHASH codes recorded by the second dataset to obtain M different GEOHASH codes; a second determining unit, configured to determine, for the M different GEOHASH codes, a central point latitude in a geographical region represented by each GEOHASH code and a central point longitude in a geographical region represented by each GEOHASH code; and a recording unit, configured to record M groups of the GEOHASH codes, the central point latitudes in the geographical regions represented by the GEOHASH codes, and the central point longitudes in the geographical regions represented by the GEOHASH codes that have correspondences to obtain the third dataset.

In some embodiments, the apparatus further includes: a fourth obtaining module, configured to obtain place names of stores included in a target region located in the P regions to obtain a place name set; a word segmentation module, configured to perform word segmentation on each place name in the place name set to obtain a word segmentation result; and a determining module, configured to determine, when there is a place name word that has the quantity of occurrences greater than a third predetermined threshold in the word segmentation result, the place name word as a region name of the target region.

In some embodiments, the third dataset records M groups of the region numbers, central point latitudes in the geographical regions represented by the region numbers, central point longitudes in the geographical regions represented by the region numbers, and quantities of places in the geographical regions represented by the region numbers that have correspondences; and the division module includes: a division unit, configured to divide, according to the quantity of places in the geographical region represented by each of the region numbers and distances between central points of the geographical regions represented by the M region numbers, the geographical regions represented by the M region numbers into P regions.

In some embodiments, the division unit includes: a determining subunit, configured to determine a weight value corresponding to a first central point in the geographical region represented by each of the region numbers according to the quantity of places in the geographical region represented by each of the region numbers; a marking subunit, configured to mark, according to the weight value corresponding to each first central point and the quantity of second central points other than the first central point existing in a range with the first central point as a center and a predetermined radius value as a radius, the first central point as a core object, a non-core object, or a noise object; and a processing subunit, configured to record, when the first central point is marked as the core object, and the geographical regions where the first central point and one central point existing in the second central points located in the range are located are recorded to be located in a target region, the geographical regions where the first central point and the second central points located in the range are located to be located in the target region; and record, when the first central point is marked as the core object, and the geographical regions where the first central point and all central points in the second central points located in the range are located are not recorded to be located in the region, the geographical regions where the first central point and the second central points located in the range are located to be located in the same region.

In some embodiments, the determining subunit is configured to determine a mean value of the quantities of places in the geographical regions represented by all the region numbers and a standard deviation of the quantities of places in the geographical regions represented by all the region numbers; determine a difference between the quantity of places in the geographical region represented by each of the region numbers and the mean value; and determine a ratio between the difference and the standard deviation as the weight value corresponding to the first central point in the geographical region represented by each of the region numbers.

In some embodiments, the marking subunit is configured to mark the first central point as the core object when the weight value is greater than a first predetermined threshold; mark, according to the quantity of the second central points other than the first central point existing in the range with the first central point as the center and the predetermined radius value as the radius, when the weight value is less than the first predetermined threshold and greater than a second predetermined threshold, the first central point as the core object, the non-core object, or the noise object; and mark, according to the quantity of the second central points other than the first central point existing in the range with the first central point as the center and the predetermined radius value as the radius, when the weight value is less than the second predetermined threshold, the first central point as the non-core object or the noise object. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In some embodiments, the apparatus further includes: a display module, configured to mark the P regions and/or the geographical regions represented by the M region numbers on an electronic map displayed on a client.

For case of understanding of the method for dividing a region provided in the embodiments of this application, descriptions are provided in the following with reference to a specific application scenario example.

Figure 7:
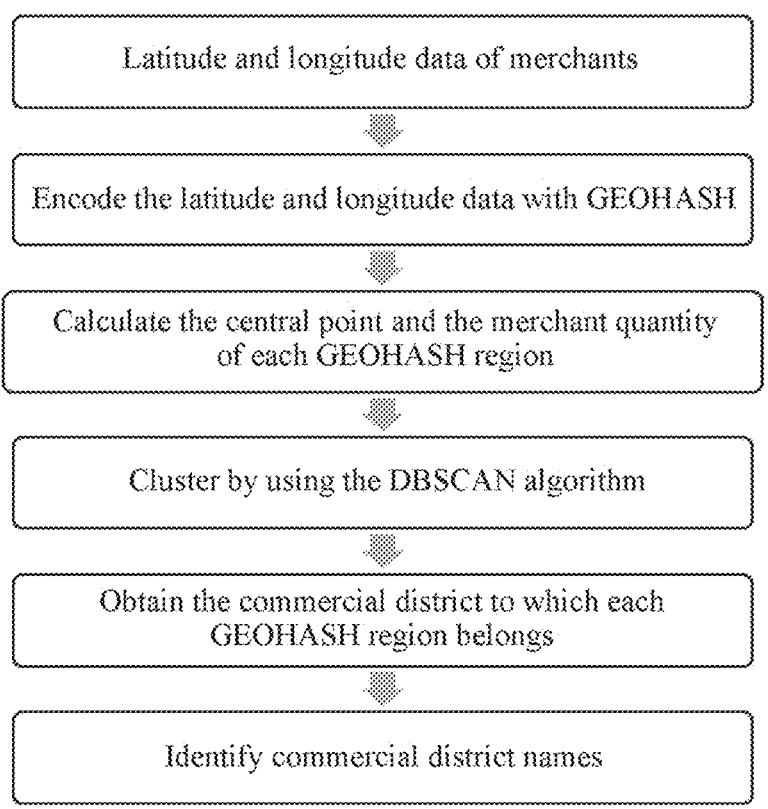
FIG. 7 is a schematic diagram of an exemplary method for dividing a region according to an embodiment of this application.

In an exemplary embodiment, the foregoing method for dividing a region may, but is not limited to, be applied to a scenario of dividing a commercial district for merchants shown in FIG. 7. In this scenario, the commercial district is divided for the city based on GEOHASH and DBSCAN algorithms through merchant location data. Through the latitude and longitude data of the merchants, the division of the commercial districts and the geographic ranges of the commercial districts in various cities may be obtained. If there is merchant name or map data, commercial district names may further be automatically generated. There is no need to perform offline investigation or collect other dimensions of data for each city, which greatly improves the efficiency of commercial district identification, and can perform timely updating and can directly determine a commercial district to which a newly opened merchant belongs, so that the commercial district information can be more effectively used in scenarios such as a merchant analysis system and marketing.

In this scenario, the geographical regions of the city are divided and the commercial districts are named according to the merchant location data. The location data of merchants is public information on the map. The commercial district is divided according to the quantity and density of merchants in each region range, and the division can change in time with changes of the commercial district. A commercial district result is the determination of the regions, and when a new merchant enters, which commercial district the new merchant belongs to may be quickly determined.

As shown in FIG. 7, the process includes the following steps:

Step a. Obtain latitude and longitude data of merchants, and the latitude and longitude data corresponding to the merchants may be obtained through the opening of the API of the map application according to the existing merchant name data. The obtained merchant latitude and longitude dataset: S={(merchant name 1, latitude 1, longitude 1), (merchant name 2, latitude 2, longitude 2), . . . , (merchant name N, latitude N, longitude N); N being the total number of merchants}.

Step b. Encode the latitude and longitude data with GEOHASH. The encoding precision may be adjusted according to data quality. If the amount of data is large enough and accurate, a fine precision may be used, otherwise a coarser precision may be selected. For example: the commercial district result shown in FIG. 5 is divided with a precision 7 (that is, each GEOHASH region represents 152.9 m*152.4 m). After random inspections in some cities, the shape of the commercial districts can be better captured. The obtained merchant GEOHASH code dataset S'={(merchant name 1, GEOHASH code 1), (merchant name 2, GEOHASH code 2), . . . , (merchant name N, GEOHASH code N); N being the quantity of merchants}.

Step c. Calculate the central point and the merchant quantity of each GEOHASH code. The obtained merchant GEOHASH code dataset: G={(GEOHASH code 1, central point latitude 1, central point longitude 1, merchant quantity 1), (GEOHASH code 2, central point latitude 2, central point longitude 2, merchant quantity 2), . . . , (GEOHASH code M, central point latitude M, central point longitude M, merchant quantity M); M being the quantity of GEOHASH codes}.

Step d. Cluster by using the DBSCAN algorithm.

Step e. Obtain the commercial district to which each GEOHASH region belongs. After the clustering results are obtained, the clustering results may further be finely adjusted according to actual application requirements to make the division results more in line with actual cognition, and the commercial district to which each GEOHASH region belongs is obtained after the fine adjustment. The adjustment manner is as follows:

1) Merger of commercial districts: if the commercial district has only four or fewer GEOHASH regions, whether it is "neighboring" to other major commercial districts is checked, and if it is, the commercial district is classified into a major commercial district to avoid excessively fragmented commercial districts.

A method for determining neighboring GEOHASH regions may be the following: GEOHASH codes are decoded to obtain latitudes and longitudes of four corners of the region. These latitudes and longitudes plus fixed length and width of GEOHASH may obtain longitudes and latitudes of centers of the surrounding eight GEOHASH regions, and transcoding again may obtain neighboring regions of each GEOHASH region.

2) Parameter adjustment: for different data situations, the parameters of precision and clustering of GEOHASH may be adjusted appropriately to find optimal parameters. The process of adjusting the parameters may be determined according to analysis experience by comparing to marked commercial district data or by drawing a division result on the map. Combinations of a plurality of parameters may be tried to find the optimal parameters.

Step f. Identify commercial district names. If the data has merchant names, each commercial district may be named according to the merchant name data. The manner of extracting a high-frequency word that is suspected to be the commercial district name from the merchant name may be used. The commercial district name usually appears in a branch store name, such as Green Tea (Coastal City Store) and KFC-Coastal City Store. Word segmentation is performed on the merchant names to obtain a candidate word, and the frequency of each word in the commercial district is calculated to set a frequency threshold. If there is a place name word that meets the conditions, it is used as the name of the commercial district, and the threshold needs to be adjusted according to data quality. Information describing coordinate locations may also be obtained through the latitude and longitude of the central point of each commercial district, the opening of the API of the map application, and reverse address resolution, including well-known surrounding regions, commercial districts, township streets, first-level landmarks, second-level landmarks, and intersections. When commercial districts are named, a priority order of "well-known surrounding region→commercial district-→township street→first-level landmark→second-level landmark→intersection" is used to determine names of the commercial districts. If there are a plurality of commercial districts with the same name, a next priority is used. For example: well-known surrounding regions in the plurality of commercial districts are the same, the commercial district information is used, and if the commercial district information is the same again, the township street is used, and so on. Finally, each commercial district has a unique name.

Figure 8:
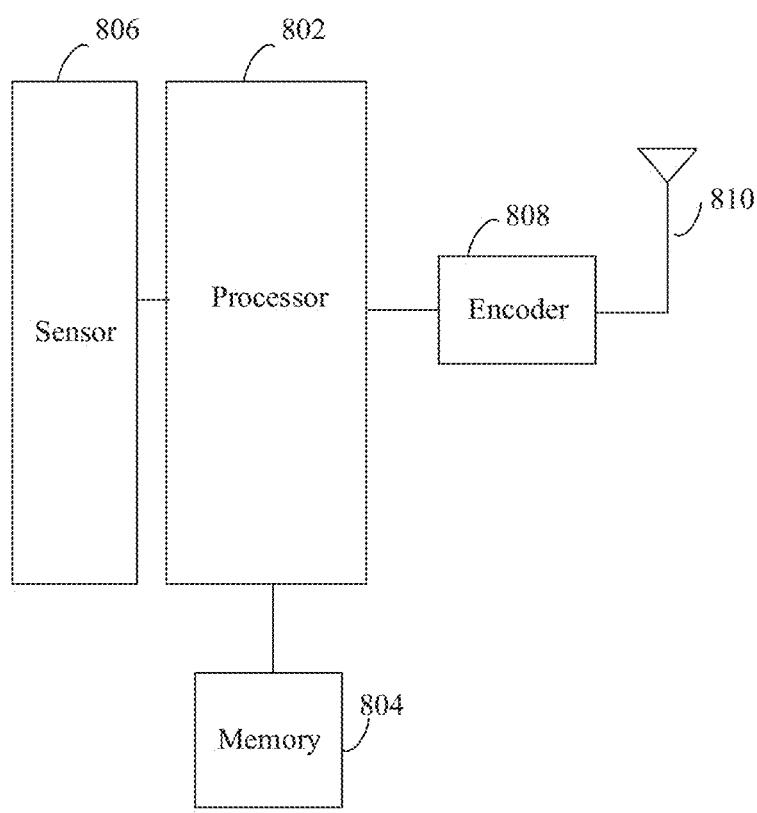
FIG. 8 is a schematic diagram of an exemplary electronic device according to an embodiment of this application.

According to an aspect of the embodiments of this application, an electronic device configured to implement the foregoing commercial district division is further provided. As shown in FIG. 8, the electronic device includes: one or more (only one is shown in the figure) processors 802, a memory 804, a sensor 806, an encoder 808, and a transmission apparatus 810. The memory stores a computer program, and the processor is configured to perform the steps in any one of the foregoing method embodiments through the computer program.

In some embodiments, in this embodiment, the foregoing electronic device may be located in at least one of a plurality of network devices of a computer network.

In some embodiments, in this embodiment, the processor 802 may be configured to perform the following steps through the computer program:

Encode latitudes and longitudes in a first dataset to obtain a second dataset, the first dataset recording N groups of latitudes and longitudes that have correspondences, N being a positive integer, and N≥1, and the second dataset recording N region numbers, and each of the region numbers being used for representing a geographical region.

Obtain a third dataset according to the second dataset, the third dataset recording M groups of the region numbers, central point latitudes in the geographical regions represented by the region numbers, and central point longitudes in the geographical regions represented by the region numbers that have correspondences, M being a positive integer, M≥1, and M being the quantity of the region numbers.

Divide the geographical regions represented by the M region numbers into P regions according to the third dataset, P being a positive integer, P≥1, and each of the regions including at least one of the geographical regions represented by the region numbers.

In some embodiments, a person of ordinary skill in the art may understand that, the structure shown in FIG. 8 is merely for illustration. The electronic device may also be a terminal device such as a smartphone (such as an Android mobile phone or an iOS mobile phone), a tablet computer, a palmtop computer, a mobile Internet device (MID), or a PAD. FIG. 8 does not constitute a limitation on the structure of the foregoing electronic device. For example, the electronic device may alternatively include more or fewer components (such as a network interface and a display device) than those shown in FIG. 8, or has a configuration different from that shown in FIG. 8.

The memory 804 may be configured to store a software program and module, for example, a program instruction/module corresponding to the method and apparatus for dividing a region in the embodiments of this application. The processor 802 runs the software program and module stored in the memory 804, to perform various functional applications and data processing, that is, implement the foregoing control method of target components. The memory 804 may include a high-speed random memory, and may also include a non-volatile memory, for example, one or more magnetic storage apparatuses, a flash memory, or another non-volatile solid-state memory. In some examples, the memory 804 may further include memories remotely disposed relative to the processor 802, and the remote memories may be connected to a terminal through a network. The foregoing examples of the network include, but are not limited to, the Internet, an intranet, a local area network, a mobile communication network, and a combination thereof.

The transmission apparatus 810 is configured to receive or transmit data through a network. The foregoing specific examples of the network may include a wired network and a wireless network. In an example, the transmission apparatus 810 includes a network interface controller (NIC). The NIC may be connected to another network device and a router by using a network cable, so as to communicate with the Internet or a local area network. In an example, the transmission apparatus 810 is a radio frequency (RF) module, which communicates with the Internet in a wireless manner.

Specifically, the memory 804 is configured to store an application program.

An embodiment of this application further provides a storage medium, storing a computer program, the computer program being configured to perform, when run, the steps in any one of the foregoing method embodiments.

In some embodiments, in this embodiment, the storage medium may be configured to store a computer program for performing the following steps:

Encode latitudes and longitudes in a first dataset to obtain a second dataset, the first dataset recording N groups of latitudes and longitudes that have correspondences, N being a natural number, and the second dataset recording N region numbers, and each of the region numbers being used for representing a geographical region.

Obtain a third dataset according to the second dataset, the third dataset recording M groups of the region numbers, central point latitudes in the geographical regions represented by the region numbers, and central point longitudes in the geographical regions represented by the region numbers that have correspondences, M being a natural number, and M being the quantity of the region numbers.

Divide the geographical regions represented by the M region numbers into P regions according to the third dataset, P being a natural number, and each of the regions including at least one of the geographical regions represented by the region numbers.

In some embodiments, the storage medium is further configured to store a computer program used for performing the steps included in the methods according to the foregoing embodiments, and details are not described again in this embodiment.

In some embodiments, in this embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

An embodiment of this application further provides a computer program product including instructions, the computer program product, when run on a server, causing the server to perform the method according to any one of the foregoing embodiments.

The sequence numbers of the foregoing embodiments of this application are merely for description, and are not intended to indicate the preference among the embodiments.

In a case that the integrated unit in the foregoing embodiments is implemented in the form of a software function unit and sold or used as an independent product, the integrated unit may be stored in the foregoing computer-readable storage medium. Based on such understanding, the technical solutions of this application essentially, or some contributing to the related art, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that the disclosed client may be implemented in other manners. The described apparatus embodiments are merely exemplary. For example, the unit division is merely logical function division, and may use other division manners during actual implementation. For example, a plurality of units or components may be combined or integrated into another system, or some features may be omitted or not performed. In addition, the coupling, or direct coupling, or communication connection between the displayed or discussed components may be the indirect coupling or communication connection through some interfaces, units, or modules, and may be in electrical or other forms.

The units described as separate parts may or may not be physically separated, and the components displayed as units may or may not be physical units, and may be located in one place or may be distributed over a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in a form of a software functional unit.

The foregoing descriptions are exemplary implementations of this application. A person of ordinary skill in the art may make several improvements and refinements without departing from the principle of this application, and the improvements and refinements shall fall within the protection scope of this application.

What is claimed is:

1. A method for dividing geographical regions based on their corresponding place names performed at a computing device, the method comprising:
   obtaining N groups of the place names and their corresponding latitudes and longitudes, N being a positive integer, and N≥1;
   converting the N groups of the place names and their corresponding latitudes and the longitudes into a first dataset;
   encoding latitudes and longitudes in the first dataset into a second dataset, each pair of latitude and longitude corresponding to a respective geographical region associated with a region number in the second dataset;
   converting the second dataset into a third dataset, the third dataset including M groups of region numbers, each group of region numbers representing central point latitudes and central point longitudes in the geographical regions represented by the group of region numbers, M being a positive integer, M≥1;
   dividing the geographical regions represented by the M groups of region numbers into P commercial regions according to the third dataset, P being a positive integer, P≥1, and each of the P commercial regions comprising at least one of the geographical regions represented by the corresponding group of region numbers, further including:
      determining a weight value corresponding to a first central point in a first geographical region represented by each of the M groups of region numbers according to a quantity of places in the first geographical region;
      marking the first central point as a core object, a non-core object, or a noise object according to the weight value corresponding to the first central point and a quantity of second central points, wherein the second central points are points other than the first central point existing within a circular range defined by the first central point as a center and a predetermined radius value as a radius; and
      including, into one of the P commercial regions, the first geographical region including the first central point and a second geographical region including at least one of the second central points within the circular range when the first central point is marked as the core object, wherein the second geographical region is different from the first geographical region; and marking the P commercial regions and/or the geographical regions represented by the M groups of region numbers on an electronic map displayed on a client.

2. The method according to claim 1, wherein the dividing the geographical regions represented by the M groups of region numbers into the P commercial regions according to the third dataset comprises:

when there is a first region in the P commercial regions, determining a second region neighboring to the first region in the P commercial regions, the quantity of the geographical regions comprised in the first region being less than a fourth predetermined threshold; and adding the geographical regions comprised in the first region to the second region.

3. The method according to claim 1, wherein the encoding latitudes and longitudes in a first dataset into a second dataset comprises:

encoding the latitudes and the longitudes in the first dataset with GEOHASH codes into the second dataset, the second dataset including N groups of place names and their GEOHASH codes, and the region numbers being the GEOHASH codes, wherein encoding latitudes and longitudes in a dataset with GEOHASH codes is to convert two-dimensional latitudes and longitudes into character strings.

4. The method according to claim 3, wherein the converting the second dataset into a third dataset comprises:

clustering the GEOHASH codes in the second dataset to obtain M different GEOHASH codes;

determining, for the M different GEOHASH codes, a central point latitude and a central point longitude in a geographical region represented by each GEOHASH code; and recording M groups of the GEOHASH codes, the corresponding central point latitudes and central point longitudes in the geographical regions represented by the GEOHASH codes to obtain the third dataset.

5. The method according to claim 1, wherein the method further comprises:

obtaining place names comprised in a target region located in the P commercial regions to obtain a place name set;

performing word segmentation on each place name in the place name set to obtain a word segmentation result; and determining, when there is a place name word that has a quantity of occurrences greater than a third predetermined threshold in the word segmentation result, the place name word as a region name of the target region.

6. The method according to claim 1, wherein the third dataset includes M groups of the region numbers, their corresponding central point latitudes, central point longitudes, and quantities of places in the geographical regions represented by the region numbers; and the dividing the geographical regions represented by the M groups of region numbers into the P commercial regions according to the third dataset comprises:

dividing, according to the quantity of places in the geographical region represented by each group of region numbers and distances between central points of the geographical regions represented by the M region numbers, the geographical regions represented by the M groups of region numbers into the P commercial regions.

7. A computing device, comprising a memory and a processor, the memory storing a plurality of computer programs that, when executed by the processor, cause the computing device to perform a method for dividing geographical regions based on their corresponding place names including:

obtaining N groups of the place names and their corresponding latitudes and longitudes, N being a positive integer, and N≥1;

converting the N groups of the place names and their corresponding latitudes and the longitudes into a first dataset;

encoding latitudes and longitudes in the first dataset into a second dataset, each pair of latitude and longitude corresponding to a respective geographical region associated with a region number in the second dataset;

converting the second dataset into a third dataset, the third dataset including M groups of region numbers, each group of region numbers representing central point latitudes and central point longitudes in the geographical regions represented by the group of region numbers, M being a positive integer, M≥1;

dividing the geographical regions represented by the M groups of region numbers into P commercial regions according to the third dataset, P being a positive integer, P≥1, and each of the P commercial regions comprising at least one of the geographical regions represented by the corresponding group of region numbers, further including:

determining a weight value corresponding to a first central point in a first geographical region represented by each of the M groups of region numbers according to a quantity of places in the first geographical region;

marking the first central point as a core object, a non-core object, or a noise object according to the weight value corresponding to the first central point and a quantity of second central points, wherein the second central points are points other than the first central point existing within a circular range defined by the first central point as a center and a predetermined radius value as a radius; and including, into one of the P commercial regions, the first geographical region including the first central point and a second geographical region including at least one of the second central points within the circular range when the first central point is marked as the core object, wherein the second geographical region is different from the first geographical region; and marking the P commercial regions and/or the geographical regions represented by the M groups of region numbers on an electronic map displayed on a client.

8. The computing device according to claim 7, wherein the dividing the geographical regions represented by the M groups of region numbers into the P commercial regions according to the third dataset comprises:

when there is a first region in the P commercial regions, determining a second region neighboring to the first region in the P commercial regions, the quantity of the geographical regions comprised in the first region being less than a fourth predetermined threshold; and adding the geographical regions comprised in the first region to the second region.

9. The computing device according to claim 7, wherein the encoding latitudes and longitudes in a first dataset into a second dataset comprises:

encoding the latitudes and the longitudes in the first dataset with GEOHASH codes into the second dataset, the second dataset including N groups of place names and their GEOHASH codes, and the region numbers being the GEOHASH codes, wherein encoding latitudes and longitudes in a dataset with GEOHASH codes is to convert two-dimensional latitudes and longitudes into character strings.

10. The computing device according to claim 9, wherein the converting the second dataset into a third dataset comprises:

clustering the GEOHASH codes in the second dataset to obtain M different GEOHASH codes;

determining, for the M different GEOHASH codes, a central point latitude and a central point longitude in a geographical region represented by each GEOHASH code; and recording M groups of the GEOHASH codes, the corresponding central point latitudes and central point longitudes in the geographical regions represented by the GEOHASH codes to obtain the third dataset.

11. The computing device according to claim 7, wherein the method further comprises:

obtaining place names comprised in a target region located in the P commercial regions to obtain a place name set;

performing word segmentation on each place name in the place name set to obtain a word segmentation result; and determining, when there is a place name word that has a quantity of occurrences greater than a third predetermined threshold in the word segmentation result, the place name word as a region name of the target region.

12. The computing device according to claim 7, wherein the third dataset includes M groups of the region numbers, their corresponding central point latitudes, central point longitudes, and quantities of places in the geographical regions represented by the region numbers; and the dividing the geographical regions represented by the M groups of region numbers into the P commercial regions according to the third dataset comprises:

dividing, according to the quantity of places in the geographical region represented by each group of region numbers and distances between central points of the geographical regions represented by the M region numbers, the geographical regions represented by the M groups of region numbers into the P commercial regions.

13. A non-transitory computer readable storage medium, storing a plurality of computer programs that, when executed by a processor a computing device, cause the computing device to perform a method for dividing geographical regions based on their corresponding place names including:

obtaining N groups of the place names and their corresponding latitudes and longitudes, N being a positive integer, and N≥1;

converting the N groups of the place names and their corresponding latitudes and the longitudes into a first dataset;

encoding latitudes and longitudes in the first dataset into a second dataset, each pair of latitude and longitude corresponding to a respective geographical region associated with a region number in the second dataset;

converting the second dataset into a third dataset, the third dataset including M groups of region numbers, each group of region numbers representing central point latitudes and central point longitudes in the geographical regions represented by the group of region numbers, M being a positive integer, M≥1;

dividing the geographical regions represented by the M groups of region numbers into P commercial regions according to the third dataset, P being a positive integer, P≥1, and each of the P commercial regions comprising at least one of the geographical regions represented by the corresponding group of region numbers, further including:

determining a weight value corresponding to a first central point in a first geographical region represented by each of the M groups of region numbers according to a quantity of places in the first geographical region;

marking the first central point as a core object, a non-core object, or a noise object according to the weight value corresponding to the first central point and a quantity of second central points, wherein the second central points are points other than the first central point existing within a circular range defined by the first central point as a center and a predetermined radius value as a radius; and including, into one of the P commercial regions, the first geographical region including the first central point and a second geographical region including at least one of the second central points within the circular range when the first central point is marked as the core object, wherein the second geographical region is different from the first geographical region; and marking the P commercial regions and/or the geographical regions represented by the M groups of region numbers on an electronic map displayed on a client.

14. The non-transitory computer readable storage medium according to claim 13, wherein the dividing the geographical regions represented by the M groups of region numbers into the P commercial regions according to the third dataset comprises:

when there is a first region in the P commercial regions, determining a second region neighboring to the first region in the P commercial regions, the quantity of the geographical regions comprised in the first region being less than a fourth predetermined threshold; and adding the geographical regions comprised in the first region to the second region.

15. The non-transitory computer readable storage medium according to claim 13, wherein the encoding latitudes and longitudes in a first dataset into a second dataset comprises:

encoding the latitudes and the longitudes in the first dataset with GEOHASH codes into the second dataset, the second dataset including N groups of place names and their GEOHASH codes, and the region numbers being the GEOHASH codes, wherein encoding latitudes and longitudes in a dataset with GEOHASH codes is to convert two-dimensional latitudes and longitudes into character strings.

16. The non-transitory computer readable storage medium according to claim 13, wherein the method further comprises:

obtaining place names comprised in a target region located in the P commercial regions to obtain a place name set;

performing word segmentation on each place name in the place name set to obtain a word segmentation result; and determining, when there is a place name word that has a quantity of occurrences greater than a third predetermined threshold in the word segmentation result, the place name word as a region name of the target region.

17. The non-transitory computer readable storage medium according to claim 13, wherein the third dataset includes M groups of the region numbers, their corresponding central point latitudes, central point longitudes, and quantities of places in the geographical regions represented by the region numbers; and the dividing the geographical regions represented by the M groups of region numbers into the P commercial regions according to the third dataset comprises:

dividing, according to the quantity of places in the geographical region represented by each group of region numbers and distances between central points of the geographical regions represented by the M region numbers, the geographical regions represented by the M groups of region numbers into the P commercial regions.

\* \* \* \* \*